Figure 1:
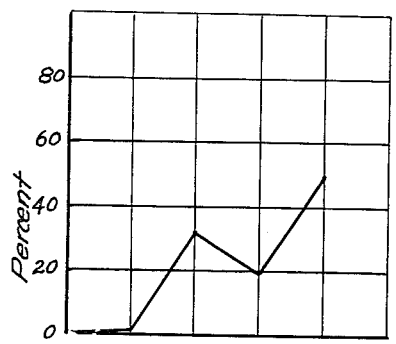

May 21, 1963 L. P. HARRIS 3,090,668
METHOD OF MAKING GRANULAR CALCIUM ARSENATE
Filed Nov. 5, 1958

INVENTOR.
LEWIS P. HARRIS
BY Robert A. Sturges
ATTORNEY 3,090,668
METHOD OF MAKING GRANULAR CALCIUM ARSENATE
Lewis P. Harris, Detroit, Mich., assignor to The Sherwin-Williams Company, Cleveland, Ohio, a corporation of Ohio
Filed Nov. 5, 1958, Ser. No. 772,075
2 Claims. (Cl. 23—53)

This invention relates as indicated to a method for making granular calcium arsenate, and more particularly to a method of making this important agricultural chemical from calcium carbonate in a form readily usable for controlling crab grass and certain other lawn weeds.

Calcium arsenate is a well known material useful for many agricultural purposes among which are the control of boll weevil on cotton, potato beetles, as a larvicide, and more recently as an effective agent in the control of crab grass, particularly in respect of its toxic effect on crab grass seeds just at the time of sprouting.

Calcium arsenates have found considerable use as dusts and sprays since it is simple to produce the material in a fine powder form suitable for such uses.

Heretofore the commercially available calcium arsenate has been produced by reacting finely divided, freshly slaked lime (CaO) suspended in water with arsenic acid. The product is obtained as an almost impalpable powder. While it is in ideal form for suspension in aqueous or non-aqueous media for spray application or dusting by means of fans, it is not satisfactory for dry, spreader-cart application, particularly because of its tendency to agglomerate and stick to the point of clogging spreader apertures. Dusting is not suitable for use on turf areas because of drift and toxicity hazards.

Granular forms of calcium arsenate are therefore indicated and desirable. Attempts have been made to deposit calcium arsenate on the surface and in the interstices of various carrier materials, e.g., clay and crushed pumice. This has generally proved unsatisfactory for the reason that the dosage per unit area, for example in crab grass control, is much too high to be practical. Aggregates of this type contain calcium arsenate to the extent of from 5% to 50% which in most applications is too low for economical application. 70 to 100 lbs. of material per 1,000 square feet would be required at the lower levels of calcium arsenate concentration. Desired application rates of the material are in the range of from 10 to 30 lbs. per thousand square feet of area.

It is a principal object of this invention, therefore, to provide a novel method of making granular calcium arsenate.

Other objects of the invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that calcium arsenate can be conveniently produced directly in a granular form from granular calcium carbonate by a process of contacting granular calcium carbonate with arsenic acid containing no more than about 40% of water, the relative amount of calcium carbonate and acid being sufficient to provide an end product which contains from about 25% to about 100% by weight of calcium arsenate, agitating the reaction mass through the stage of gas evolution, in which stage the reaction mass is of a pastry consistency, and continuing such agitation until the reaction mass begins to crumble or "grain" and thereafter screening the resultant product.

In the annexed drawings are a series of charts which graphically show the distribution of particle size of a typical starting material, e.g., marble grits, and the particle size of products obtained from various screened fractions of the raw material.

Broadly stated, this invention is in the method of making granular calcium arsenate having an average particle size in the range of from about 2 to about 100 mesh which comprises reacting solid granular calcium carbonate having an average particle size in the range of from about 2 to about 100 mesh, with an amount of arsenic acid in the range of from about 10% to about 100% of the equivalent weight of arsenic acid theoretically required to convert all of the calcium carbonate to calcium arsenate and from about 2.9% to about 30% by weight of the total batch weight of water, maintaining the reaction mass under agitation during the period when carbon dioxide is being released in the course of the reaction, and terminating such agitation at the stage of the reaction when the reaction mass begins to crumble, and recovering the granular calcium arsenate.

Mesh sizes referred to herein are Tyler Standard Screen Sizes.

The arsenic acid, $H_3AsO_4$ used in the process of this invention is conveniently commercial arsenic acid which contains about 75% arsenic acid and about 25% water. It has been found that this acid may be diluted further with water to a concentration of about 60% by weight acid; or the acid may be used in a more concentrated form up to about 85% by weight acid. If additional amounts of water are to be admixed in the reaction mass, it should be saturated with calcium arsenate.

The amount of arsenic acid which is used in this process is, of course, controlled by the concentration of calcium arsenate desired in the end product. A satisfactory commercial product contains from 60–70% calcium arsenate, although for certain uses, calcium arsenate concentrations in the end product may range as low as about 25% up to as high as 100%. The balance of the composition, where the amount of arsenic acid employed is less than that which is chemically equivalent to the calcium carbonate at the start, is unconverted calcium carbonate. On the basis of these limits, the amount of water present in the initial reaction mass, which is composed of water plus calcium carbonate plus $H_3AsO_4$, is in the range of from about 2.9% to about 30% of the combined weight of the three named ingredients.

The calcium carbonate utilized in the practice of this invention may come from any source so long as it is relatively pure calcium carbonate. Thus crushed oyster shells, calcite, marble chips or grits, limestone, clam shells, etc. may be used. "Mine run" marble grits, a commercially available, inexpensive raw material, has a particle size distribution represented by FIG. 1 in the annexed drawings. For better control of the ultimate particle size of the end product, the commercially available crushed products may be more finely screened to separate out desired fractions of the source of calcium carbonate. In general, the particle size of the starting calcium carbonate is from 2 to 100 mesh. The particle size range of the end product will, strangely enough, also be within about this same range, although if the process is carried out in the manner herein set forth, there is a tendency for the distribution curve to shift to the left as the annexed drawings indicate, demonstrating an increase in the average particle size of the final product over that of the initial starting material.

The time of the reaction is dependent upon the temperature, the surface area of the calcium carbonate particles, the concentration of the arsenic acid and the extent of agitation. A fixed time of the reaction cannot be stated with accuracy as it is difficult to specify that with "mine run" marble grits, for example, having a particle size range of from through 20 on 80 mesh reacted in a ratio of 100 lbs. of marble to 110 lbs. of 75% arsenic acid will form a "grained" product within one hour. No time limit can be pre-selected for any given reaction mass. It is critical, however, that agitation of the reaction mass be terminated within a few minutes of the time when the reaction has proceeded to the point where it loses its pasty character and visibly begins to crumble and form granules. This is termed "graining." Graining can be secured in times ranging from 10 minutes to 5 or more hours, depending on the inter-relationship of all of the variables mentioned above. There is, in the course of the reaction, however, a distinct change in the character of the reaction mass from a pasty or "doughy" character wherein the amount of available liquid external of the calcium carbonate particles is sufficient to make a thick pasty mass. As the reaction proceeds and the evolved carbon dioxide is removed, the arsenic acid is depleted and replaced with water which then appears to become water of crystallization in the resultant product. The gas-liquid binder generating the "paste" is gradually exhausted and all of a sudden the mass begins to crumble hausted and all of a sudden the mass begins to crumble or "grain." This is the end point of the reaction in accordance with this process. Thus, time in and of itself is not critical but the duration of agitation as determined by the appearance of this end point of the reaction is critical. In the usual case, "graining" occurs within about one hour. It should be understood that the reaction can be interrupted at any time from the initial striking of the calcium carbonate with the arsenic acid until the time when the reaction has reached equilibrium. Ordinarily, a maximum of 6 hours will be found sufficient for the reaction under the conditions hereof.

The temperature of the reaction may be that spontaneously reached in the course of the reaction without the application or abstraction of heat. Of course, both the application and abstraction of heat may be provided for in the process if desired.

After the reaction has proceeded to completion, or to the point of interruption as may be desired, the particles may be separated from the reaction mass by a simple drying, screening and crushing operation to yield a free flowing granular mass. "Drying" as used herein simply means the removal of excess water which would render the particles too damp for "free flowing." It is to be understood that ordinary residual water will remain in the particles in such "drying" operation. In other words, it is not essential for the purposes of this invention to remove 100% of the water, such a degree of drying seldom being obtained in commercial processes of this sort anyway. Drying temperatures are not in excess of about 300° F. Drying above 500° F. gives an excessive weight loss, probably due to loss of water of hydration and possibly the formation of pyroarsenates.

As indicated above, agitation and mixing are necessary. Such agitation will reduce the time required for reaching equilibrium, give proper contact between the reactants, reduce frothing, and aid removal of carbon dioxide. No particular type of apparatus is required for the production of this material. An ordinary dough mixer designed with the nature of the reactants in mind may be used. A ribbon blender has been used successfully in the production of this material in small quantities. Arsenic acid adhering to the mixer wall from the initial frothing action must be scraped into the reaction mass during the dough stage or washed in with a very limited amount of water.

In is convenient at this point to give specific examples to illustrate the method of the present invention, it being understood that these examples are for the purpose of illustrating the procedural steps involved in the invention. Minor variations in the conditions within the scope of the aforesaid disclosure are fully within the understanding of those skilled in the art after familiarizing themselves with the disclosure.

*Example 1*

100 grams of calcium carbonate (mine run marble grits) which passed through a 20 mesh screen and were held on a 40 mesh screen were reacted with 110 grams of commercial arsenic acid (75%). In carrying out the reaction, half of the acid was placed into a PB mixer. The remaining acid and screened calcium carbonate grits were then simultaneously poured into the reaction vessel, and the mixer started. Mixing and kneading of the pasty mass was continued until the reaction mass began to crumble under the kneading action of the PB mixer. Agitation was then terminated. The product was then allowed to set for about 30 minutes, and dried at 250° F. in pans in an oven. The product had the following sieve analysis:

| | Percent |
|---|---|
| All through 8 mesh on 20 mesh | 55.3 |
| Through 20 on 40 mesh | 39.2 |
| Through 40 on 80 mesh | 3.0 |
| Through 80 | 2.5 |

Figure 2:
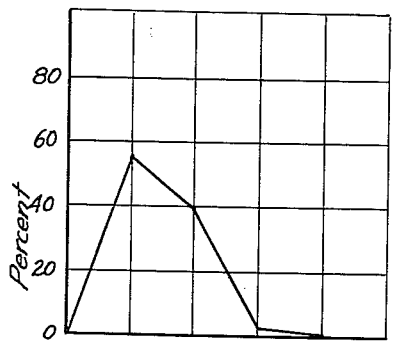

This particle size distribution is represented in FIG. 2 of the drawings.

*Example 2*

100 grams of calcium carbonate having a particle size through 40 mesh on 80 was reacted in the same manner as given in Example 1 above with 110 grams of 75% arsenic acid. The product was grained and dried in the manner of Example 1 and gave the following screen analysis:

| | Percent |
|---|---|
| On 20 mesh | 1.9 |
| Through 20 on 40 mesh | 82.0 |
| Through 40 on 80 mesh | 14.7 |
| Through 80 | 1.4 |

Figure 3:
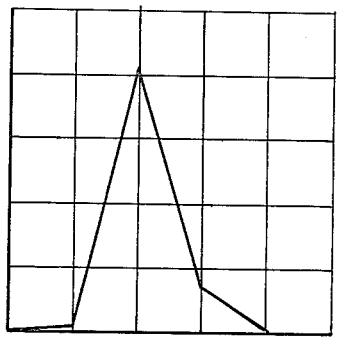

This particle size distribution is represented in FIG. 3 of the drawings.

*Example 3*

Following the same procedure set forth in Examples 1 and 2 above, calcium carbonate having a particle size such that it all passed on 80 mesh screen were reacted with 110 grams of arsenic acid, 75%. This material after graining and drying had the following particle size distribution:

| | Percent |
|---|---|
| On 20 mesh | Trace |
| Through 20 on 40 mesh | 27.2 |
| Through 40 on 80 mesh | 27.3 |
| Through 80 mesh | 45.5 |

Figure 4:
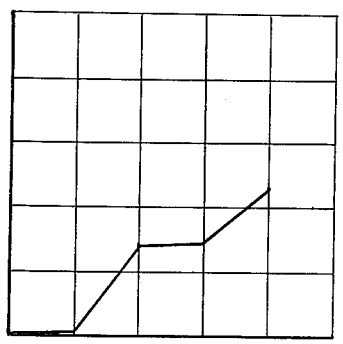

This particle size distribution is represented in FIG. 4 of the drawings. This example demonstrates dramatically how the particle size of the resultant calcium arsenate particles is increased over the average particle size of the calcium carbonate initially used. Instead of standing for 30 minutes as in the previous examples following the cessation of stirring, Example 3 stood for 1 hour. Considerable crystal intergrowth took place as was determined by microscopic examination. Pressing with a knife blade tends to break the larger agglomerated granules. It was also noted that the finer grits reacted faster than the coarser fractions in Examples 1 and 2 above.

*Example 4*

100 grams of mine run marble grits unscreened and having a particle size distribution as shown in FIG. 1 of the drawings were reacted with 110 grams of 75% arsenic acid. The product was grained and dried as in Example 1 and showed a particle size distribution of the end product as follows:

| | Percent |
|---|---|
| On 8 mesh | 0.6 |
| Through 8 on 20 | 40.4 |
| Through 20 on 40 | 47.4 |
| Through 40 on 80 | 11.6 |
| Through 80 | Trace |

Figure 5:
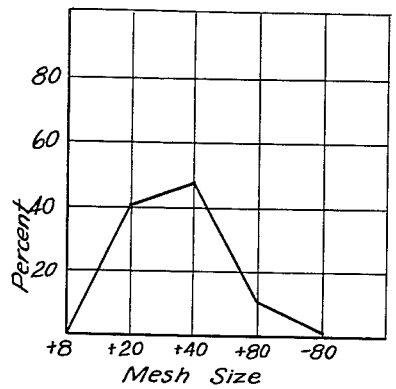

This particle size distribution is represented in FIG. 5 of the drawings. The water-soluble arsenic in this example was about 3.6%.

*Example 5*

138 grams of calcium carbonate (mine run through 20 on 80 mesh) were reacted with 147 grams of 75% arsenic acid. When the paste no longer raised, the mass grained and was allowed to stand without further agitation until it had set for approximately 30 minutes. The mass was then broken up with a spatula and dried at 110° C. This product had a water-soluble arsenic content of 2.56% (Geneva method) and analyzed 73% calcium arsenate in the dry product.

*Example 6*

600 grams of mine run calcium carbonate marble grits (through 16 on 80 mesh) and 716 grams of arsenic acid (75%) were reacted to give a theoretical batch equivalent to 85% calcium arsenate. The theoretical dry yield of product was 765 grams and that actually obtained was 780 grams. It appears that some water of hydration was not removed at the 110° C. drying temperature. The water-soluble arsenic in this composition was 8.79%, almost exactly that of so-called "low lime calcium arsenate powder prepared by conventional means."

Further examples employed less arsenic acid than that necessary to give standard 70% calcium arsenate–30% calcium carbonate and water, down to the equivalent of about 25% calcium arsenate. In the lower ranges below 50% of the theoretically equivalent amount, graining took place almost at once without a dough stage. The principal part of the reaction was completed with agitation.

In order to demonstrate the difference between the reaction of calcium carbonate with arsenic acid and the reaction of calcium oxide with arsenic acid using the same process as herein described, quick lime having the particle size of through 20 on 40 was utilized instead of the carbonate. Utilizing an equivalent amount of calcium oxide to that given in Example 1 above, and following the same procedure of Example 1, the resultant product had the following screen analysis:

| | Percent |
|---|---|
| On 20 mesh | 11 |
| Through 20 on 40 mesh | 24 |
| Through 40 on 80 mesh | 13 |
| Through 80 | 52 |

Figure 6:
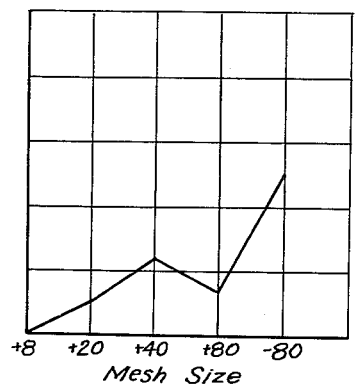

The entire mass appeared to be well granulated initially but in a few days the grains were easily crushed and many had spontaneously crumbled to powder. This is demonstrated in FIG. 6.

To illustrate the effect of dilution of the acid, a standard amount of calcium carbonate (100 grams) was mixed with the equivalent of 110 grams of 75% arsenic acid except that the arsenic acid in the several cases had been diluted with water to (a) 60% concentration, (b) to 50% concentration and (c) to 37½% concentration. Each of the reaction masses was agitated in the same manner with a dough type mixer. The product from the 60% concentration (a), required 1 hour to form granular calcium arsenate. The 50% concentrated acid reaction mass (b) required 24 hours to form granular calcium arsenate. The 37½% concentrated arsenic acid (c) remained wet and pasty after 24 hours. In (c) a considerable portion of the arsenic remained in solution which came to equilibrium at a pH of 6.8. The dry calcium arsenate granules from (c) were correspondingly low in arsenic analysis.

The addition of large amounts of water to the calcium carbonate grits gave the same effect and required the use of calcium hydroxide to force the reaction to completion. For example, 145 grams of arsenic acid (75%) reacted with 120 grams of marble grits in 400 ml. of water required 37 grams of quicklime to complete the reaction. A slurry of 360 grams of 75% arsenic acid plus 300 grams of marble grits in 200 ml. of water reacted for a period of 4 hours required 35 grams of quicklime (converted to hydroxide) to complete the reaction. The yield of dry product was 517 grams in the latter instance of a product having an analysis of 40.6% $As_2O_5$, water-soluble arsenic 2.3% as metallic (Geneva method of analysis). The dry product contained 31% material finer than 80 mesh and required 4% mineral oil to reduce dustiness.

This process will tolerate some variation in the concentration of arsenic acid. Water in excess, either on the calcium carbonate or in dilution of the arsenic acid to less than about 35% necessitates more time for graining, or the addition of a portion of slaked lime and filtering before drying to remove and insolubilize all of the arsenic from the solution with resulting increase in undesirable fines.

If dilute arsenic acid is first saturated with calcium arsenate and a new reaction mixture prepared in this liquor, in 10 to 12 hours time, the grains may be filtered or centrifuged from the liquor, dried, crushed and screened. Products have been made equivalent to 70% and 85% calcium arsenate.

The percentage of water-soluble arsenic in the compounds of the present invention may be calculated in accordance with the Geneva method for determining water-soluble arsenic. In the products of the present invention, water-soluble arsenic ranges from about 2% to about 9%. It is possible by using an excess of arsenic acid over the stoichiometric amount to obtain granular products having a water-soluble arsenic content as high as 20%. For most purposes, the water-soluble arsenic content of compositions produced in accordance herewith is within the range of 2.1% to about 8.7%.

There has thus been provided a novel method for the production of granular calcium arsenate in a particle size which can be determined by the particle size of the calcium carbonate initially employed. The mechanism by which this rather surprising result occurs is not too well understood, although it is believed that it is in the nature of a "secondary replacement." It is believed that the arsenic acid attacks first the surface of the particle and forms a coating of calcium arsenate thereon and then, due to the porosity, the arsenic acid filters into the internal portions of the particle gradually converting the entire mass (if sufficient acid is present) to calcium arsenate somewhat in the fashion of a solid-liquid reaction which forms insoluble calcium arsenate immediately in situ. Apparently, the calcium never goes into solution from which it can be precipitated as small minute particles. Thus the deposition of calcium arsenate occurs in place simultaneously upon contact with the acid with the release of carbon dioxide and hence the particle maintains substantially its original dimension.

Some of the fines in the original calcium arsenate may be entrapped as agglomerates and thus reduced. Undersize fines of product can thus be worked back into the process and salvaged. The addition of these dry fines to the reaction mixture while mixing at the dough stage materially shortens the process time to "grain" the mass. The use of about 5% standard calcium arsenate powder accomplishes the same purpose if sufficient fines are not available.

It is possible in this reaction to include in the reaction mass a dye or a pigment for coloring the end product, if desired. Also, the end product after being dried may, if desired, be treated with a light spray oil to insure against dusting, although this is generally unnecessary.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The method of making granular calcium arsenate having an average particle size substantially the same as the particle size of the calcium carbonate from which said calcium arsenate is made, which comprises reacting solid granular calcium carbonate having an average particle size in the range of from 2 to 100 mesh, with an amount of $H_3AsO_4$ in the range of from 10% to 100% of the equivalent weight of arsenic acid theoretically required to convert all of the calcium carbonate to calcium arsenate and from 2.9% to 30% by weight of the total batch weight of water, maintaining the reaction mass under agitation during the period when carbon dioxide is being released in the course of the reaction, and terminating such agitation at the stage of the reaction when the reaction mass begins to crumble, drying and recovering the granular calcium arsenate.

2. The method of making granular calcium arsenate having an average particle size substantially the same as the particle size of the calcium carbonate from which said calcium arsenate is made, which comprises reacting solid granular calcium carbonate having an average particle size in the range of from 2 to 100 mesh, with an amount of $H_3AsO_4$ in the range of from 10% to 100% of the equivalent weight of arsenic acid theoretically required to convert all of the calcium carbonate to calcium arsenate and from 2.9% to 30% by weight of the total batch weight of water, said arsenic acid having been previously saturated with calcium arsenate, maintaining the reaction mass under agitation during the period when carbon dioxide is being released in the course of the reaction, and terminating such agitation at the stage of the reaction when the reaction mass begins to crumble, drying and recovering the granular calcium arsenate.

References Cited in the file of this patent

UNITED STATES PATENTS

| | | |
|---|---|---|
| 1,447,938 | Ellis et al. | Mar. 6, 1923 |
| 1,629,557 | Walker | May 24, 1927 |
| 1,690,628 | Ellis et al. | Nov. 6, 1928 |
| 1,924,518 | Rushton | Aug. 29, 1933 |
| 2,344,895 | Pearce et al. | Mar. 21, 1944 |

OTHER REFERENCES

U.S. Dept. of Agriculture Bulletin No. 750, October 5, 1918, pages 4 and 9.